(12) United States Patent
Lacy et al.

(10) Patent No.: US 10,704,399 B2
(45) Date of Patent: Jul. 7, 2020

(54) ADAPTIVELY OPENING COOLING PATHWAY

(71) Applicant: General Electric Company, Schenectady, NY (US)

(72) Inventors: Benjamin Paul Lacy, Greer, SC (US); Brian Peter Arness, Simpsonville, SC (US); Victor John Morgan, Simpsonville, SC (US); Stephen William Tesh, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 15/609,529

(22) Filed: May 31, 2017

(65) Prior Publication Data
US 2018/0347378 A1 Dec. 6, 2018

(51) Int. Cl.
*F01D 5/18* (2006.01)
*F01D 5/28* (2006.01)
*F02B 29/04* (2006.01)

(52) U.S. Cl.
CPC ............. *F01D 5/189* (2013.01); *F01D 5/186* (2013.01); *F01D 5/187* (2013.01); *F01D 5/288* (2013.01);
(Continued)

(58) Field of Classification Search
CPC combination set(s) only.
See application file for complete search history.

(56) References Cited

U.S. PATENT DOCUMENTS 3,626,568 A 12/1971 Silverstein et al.
5,269,653 A 12/1993 Evans
(Continued)

FOREIGN PATENT DOCUMENTS

EP 1375825 A1 1/2004
EP 1655454 A1 5/2006
(Continued)

OTHER PUBLICATIONS

Extended European Search Report and Opinion issued in connection with corresponding EP Application No. 18174168.7 dated Oct. 15, 2018.
(Continued)

*Primary Examiner* — Richard A Edgar
*Assistant Examiner* — Maxime M Adjagbe
(74) *Attorney, Agent, or Firm* — Hoffman Warnick LLC (57) ABSTRACT

A hot gas path component of an industrial machine includes a cooling pathway. The component includes a body including an outer surface; a thermal barrier coating (TBC) over the outer surface, the TBC exposed to a working fluid having a high temperature; and an internal cooling circuit in the body carrying a cooling medium. A cooling pathway is in the body and in fluid communication with the internal cooling circuit. The cooling pathway includes a terminating end in the body and a length extending along and spaced internally from the outer surface by a first spacing. In response to a spall in the TBC occurring at a location over the cooling pathway and the high temperature reaching or exceeding a predetermined temperature of the body, the cooling pathway opens at the location through the first spacing to allow a flow of the cooling medium therethrough.

17 Claims, 9 Drawing Sheets (52) U.S. Cl.
CPC .... *F02B 29/0456* (2013.01); *F05D 2260/204* (2013.01); *F05D 2260/84* (2013.01); *F05D 2300/611* (2013.01)

(56) References Cited

U.S. PATENT DOCUMENTS

| | | | |
|---|---|---|---|
| 5,726,348 | A | 3/1998 | Draghi et al. |
| 6,265,022 | B1 | 7/2001 | Fernihough et al. |
| 6,412,268 | B1 * | 7/2002 | Cromer .................. F01D 9/023 60/760 |
| 6,454,156 | B1 | 9/2002 | Taras, Jr. et al. |
| 6,468,669 | B1 * | 10/2002 | Hasz ...................... B32B 15/01 428/553 |
| 6,478,537 | B2 | 11/2002 | Junkin |
| 6,511,762 | B1 * | 1/2003 | Lee ......................... B32B 18/00 428/697 |
| 7,241,107 | B2 | 7/2007 | Spanks, Jr. et al. |
| 7,674,093 | B2 * | 3/2010 | Lee ......................... B22C 9/103 164/365 |
| 7,772,314 | B2 | 8/2010 | Fernihough et al. |
| 7,909,581 | B2 | 3/2011 | Klein |
| 7,950,902 | B2 | 5/2011 | Camhi et al. |
| 8,574,671 | B2 | 11/2013 | Ahmad et al. |
| 9,617,859 | B2 | 4/2017 | Morgan et al. |
| 2004/0226682 | A1 | 11/2004 | Ehrhard et al. |
| 2006/0263217 | A1 | 11/2006 | Spanks, Jr. et al. |
| 2007/0036942 | A1 | 2/2007 | Steele |
| 2007/0253815 | A1 | 11/2007 | Kopmels et al. |
| 2009/0074576 | A1 | 3/2009 | Brostmeyer |
| 2010/0239409 | A1 | 9/2010 | Draper |
| 2011/0011563 | A1 | 1/2011 | Steele |
| 2011/0070095 | A1 | 3/2011 | Harron |
| 2011/0097188 | A1 | 4/2011 | Bunker |
| 2011/0189015 | A1 | 8/2011 | Shepherd |
| 2011/0241297 | A1 | 10/2011 | Morgan et al. |
| 2012/0183412 | A1 | 7/2012 | Lacy et al. |
| 2012/0189435 | A1 | 7/2012 | Morgan et al. |
| 2013/0052036 | A1 | 2/2013 | Smith |
| 2013/0056184 | A1 * | 3/2013 | Bunker .................. B23P 15/04 165/133 |
| 2013/0078110 | A1 | 3/2013 | Boyer |
| 2013/0104517 | A1 | 5/2013 | Correia et al. |
| 2013/0230394 | A1 | 9/2013 | Ellis et al. |
| 2014/0099183 | A1 | 4/2014 | Morgan et al. |
| 2015/0198062 | A1 | 7/2015 | Morgan et al. |
| 2016/0160760 | A1 | 6/2016 | Romanov et al. |

FOREIGN PATENT DOCUMENTS

| | | |
|---|---|---|
| EP | 2354453 A1 | 8/2011 |
| EP | 2716867 A1 | 4/2014 |
| EP | 2 857 636 A1 | 4/2015 |
| EP | 3 054 105 A1 | 8/2016 |
| EP | 3 351 729 A1 | 7/2018 |

OTHER PUBLICATIONS

"Resbond 907GF" 2350 Degrees Adhesive & Sealant Cotronics Corporation, n.d, 1 page.

"High Temperature Ceramic-metallic Pastes", AREMCO Products, Inc., Technical Bulletin A3, Jun. 2012, 2 pages.

* cited by examiner

ADAPTIVELY OPENING COOLING PATHWAY

BACKGROUND OF THE INVENTION

The disclosure relates generally to cooling of components, and more particularly, to a cooling pathway near an outer surface of a hot gas path component and within a thermal barrier coating.

Hot gas path components that are exposed to a working fluid at high temperatures are used widely in industrial machines. For example, a gas turbine system includes a turbine with a number of stages with blades extending outwardly from a supporting rotor disk. Each blade includes an airfoil over which the hot combustion gases flow. The airfoil must be cooled to withstand the high temperatures produced by the combustion gases. Insufficient cooling may result in undo stress and oxidation on the airfoil and may lead to fatigue and/or damage. The airfoil thus is generally hollow with one or more internal cooling flow circuits leading to a number of cooling holes and the like. Cooling air is discharged through the cooling holes to provide film cooling to the outer surface of the airfoil. Other types of hot gas path components and other types of turbine components may be cooled in a similar fashion.

Although many models and simulations may be performed before a given component is put into operation in the field, the exact temperatures to which a component or any area thereof may reach vary greatly due to component specific hot and cold locations. Specifically, the component may have temperature dependent properties that may be adversely affected by overheating. As a result, many hot gas path components may be overcooled to compensate for localized hot spots that may develop on the components. Such excessive overcooling, however, may have a negative impact on overall industrial machine output and efficiency.

Despite the presence of cooling passages many components also rely on a thermal barrier coating (TBC) applied to an outer surface thereof to protect the component. If a break or crack, referred to as a spall, occurs in a TBC of a hot gas path component, the local temperature of the component at the spall may rise to a harmful temperature. This situation may arise even though internal cooling circuits are present within the component at the location of the spall. One approach to addressing a TBC spall provides a plug in a cooling hole under the TBC. When a spall occurs, the plug is removed typically through exposure to heat sufficient to melt the plug, the cooling hole opens and a cooling medium can flow from an internal cooling circuit fluidly coupled to the cooling hole. The plug may be porous to assist in its removal. This process reduces overcooling. Formation of the plug however is complex, requiring precise machining and/or precise thermal or chemical processing of materials to create the plug.

BRIEF DESCRIPTION OF THE INVENTION

A first aspect of the disclosure provides a component for use in a hot gas path of an industrial machine, the component comprising: a body including an outer surface; a thermal barrier coating over the outer surface, the thermal barrier coating exposed to a working fluid having a high temperature; an internal cooling circuit in the body carrying a cooling medium; and a cooling pathway in the body and in fluid communication with the internal cooling circuit, the cooling pathway including a terminating end in the body and a length extending along and spaced internally from the outer surface by a first spacing, wherein in response to a spall in the thermal barrier coating occurring at a location over the cooling pathway and the high temperature reaching or exceeding a predetermined temperature of the body, the cooling pathway opens at the location through the first spacing to allow a flow of the cooling medium therethrough.

A second aspect of the disclosure provides a component for use in a hot gas path of an industrial machine, the component comprising: a body including an outer surface; a thermal barrier coating over the outer surface, the thermal barrier coating exposed to a working fluid having a high temperature; an internal cooling circuit in the body carrying a cooling medium; and a cooling pathway in the body and in fluid communication with the internal cooling circuit, the cooling pathway including a terminating end in the body and a length extending along and spaced internally from the outer surface by a first spacing, wherein the terminating end is spaced internally from the outer surface by a second spacing that is less than the first spacing, wherein in response to a spall in the thermal barrier coating occurring at a location over the terminating end and the high temperature reaching or exceeding a predetermined temperature of the body, the cooling pathway opens at the location over the terminating end and through the second spacing to allow a flow of the cooling medium therethrough.

A third aspect of the disclosure provides a component for use in a hot gas path of an industrial machine, the component comprising: a body including an outer surface; an internal cooling circuit in the body carrying a cooling medium; a cooling pathway in the body and in fluid communication with the internal cooling circuit, the cooling pathway including a terminating end in the body and an outer elongated opening open through the outer surface; and a thermal barrier coating over the outer surface and closing the outer elongated opening of the cooling pathway, the thermal barrier coating exposed to a working fluid having a high temperature, wherein in response to a spall in the thermal barrier coating occurring at a location over the outer elongated opening of the cooling pathway, the outer elongated opening of the cooling pathway allows a flow of the cooling medium therethrough at the location The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within an industrial machine such as a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. It will be appreciated that such terms may be applied in relation to the center axis of the turbine.

As indicated above, the disclosure provides a hot gas path (HGP) component including an adaptively opening cooling pathway therein. The cooling pathway is positioned such that when a spall occurs in a thermal barrier coating (TBC) thereover, the cooling pathway opens to allow a cooling medium to pass therethrough. In one embodiment, prior to the spall occurring, the cooling pathway is spaced from an outer surface of a body of the HGP component under the TBC. In another embodiment, a terminating end of the cooling pathway may be closer to the outer surface than the rest of the cooling pathway such that when a spall occurs over the terminating end, the terminating end opens. In another embodiment, the cooling pathway may have an outer elongated opening to outer surface of the body such that the TBC closes the elongated opening, but upon a spall occurring at a location thereover, the cooling pathway opens to allow a cooling medium therethrough. In any event, the extent of the spall determines the size of the opening and the amount of cooling. The HGP component can be made by additive manufacturing or conventional manufacturing.

Figure 1:
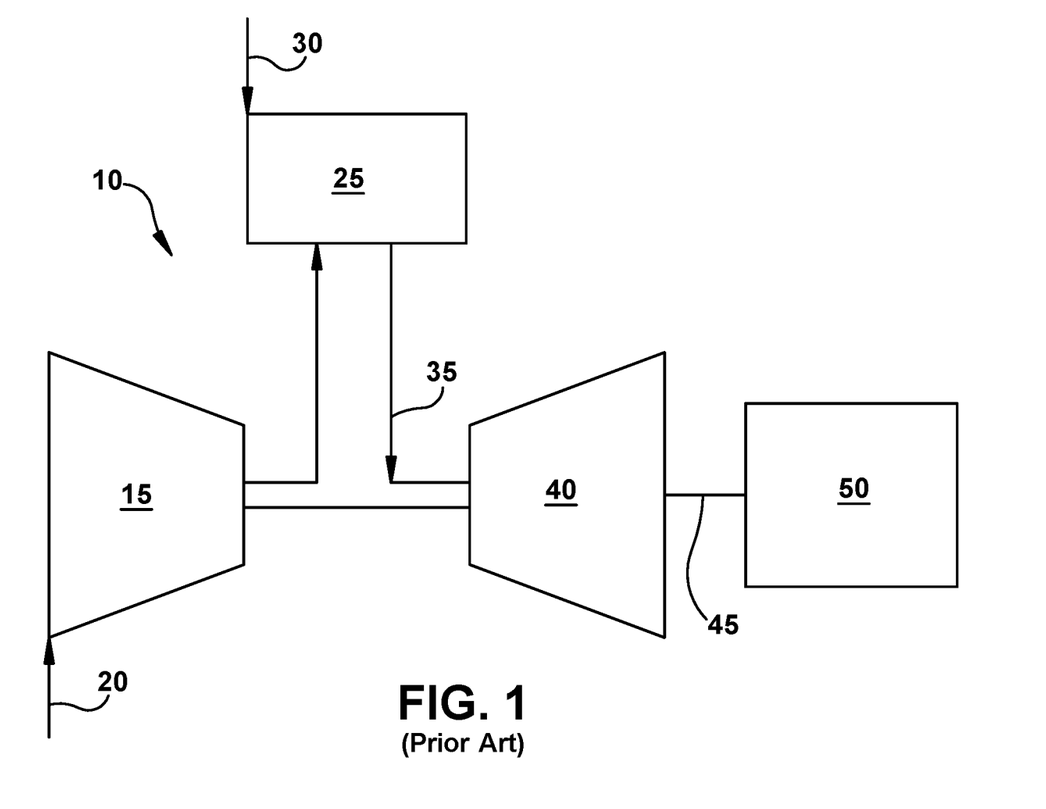
FIG. 1 is a schematic diagram of an illustrative industrial machine having a hot gas path component in the form of a gas turbine system.

Referring now to the drawings, in which like numerals refer to like elements throughout the several views, FIG. 1 shows a schematic view of an illustrative industrial machine in the form of a gas turbine system 10. While the disclosure will be described relative to gas turbine system 10, it is emphasized that the teachings of the disclosure are applicable to any industrial machine having a hot gas path component requiring cooling. Gas turbine system 10 may include a compressor 15. Compressor 15 compresses an incoming flow of air 20, and delivers the compressed flow of air 20 to a combustor 25. Combustor 25 mixes the compressed flow of air 20 with a pressurized flow of fuel 30 and ignites the mixture to create a flow of combustion gases 35. Although only a single combustor 25 is shown, gas turbine system 10 may include any number of combustors 25. Flow of combustion gases 35 is in turn delivered to a turbine 40. Flow of combustion gases 35 drives turbine 40 so as to produce mechanical work. The mechanical work produced in turbine 40 drives compressor 15 via a shaft 45 and an external load 50 such as an electrical generator and the like.

Gas turbine system 10 may use natural gas, liquid fuels, various types of syngas, and/or other types of fuels and blends thereof. Gas turbine system 10 may be any one of a number of different gas turbine engines offered by General Electric Company of Schenectady, N.Y. and the like. Gas turbine system 10 may have different configurations and may use other types of components. Teachings of the disclosure may be applicable to other types of gas turbine systems and or industrial machines using a hot gas path. Multiple gas turbine systems, or types of turbines, and or types of power generation equipment also may be used herein together.

Figure 2:
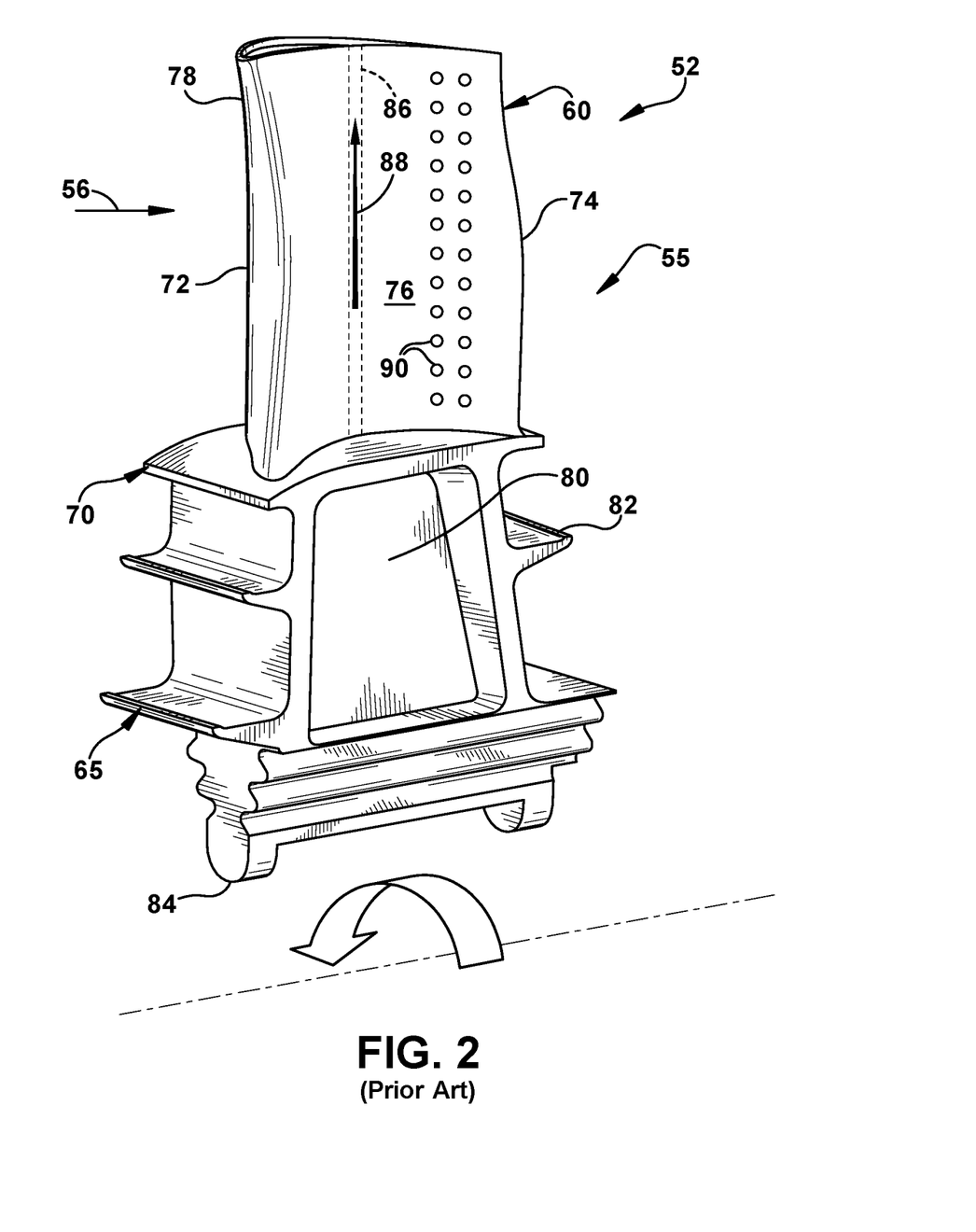
FIG. 2 is a perspective view of a known hot gas path component in the form of a turbine blade.

FIG. 2 shows an example of a hot gas path (HGP) component 52 in the form of a turbine blade 55 that may be used in a hot gas path (HGP) 56 of turbine 40 and the like. While the disclosure will be described relative to HGP component 52 in the form of turbine blade 55 and more specifically an airfoil 60 or wall thereof, it is emphasized that the teachings of the disclosure are applicable to any HGP component requiring cooling. Generally described, turbine blade 55 may include airfoil 60, a shank portion 65, and a platform 70 disposed between airfoil 60 and shank portion 65. Airfoil 60 generally extends radially upward from platform 70 and includes a leading edge 72 and a trailing edge 74. Airfoil 60 also may include a concave surface defining a pressure side 76 and an opposite convex surface defining a suction side 78. Platform 70 may be substantially horizontal and planar. Shank portion 65 may extend radially downward from platform 70 such that platform 70 generally defines an interface between airfoil 60 and shank portion 65. Shank portion 65 may include a shank cavity 80. Shank portion 65 also may include one or more angel wings 82 and a root structure 84 such as a dovetail and the like. Root structure 84 may be configured to secure, with other structure, turbine blade 55 to shaft 45 (FIG. 1). Any number of turbine blades 55 may be circumferentially arranged about shaft 45. Other components and or configurations also may be used herein.

Turbine blade 55 may include one or more cooling circuits 86 extending therethrough for flowing a cooling medium 88 such as air from compressor 15 (FIG. 1) or from another source. Steam and other types of cooling mediums 88 also may be used herein. Cooling circuits 86 and cooling medium 88 may circulate at least through portions of airfoil 60, shank portion 65, and platform 70 in any order, direction, or route. Many different types of cooling circuits and cooling mediums may be used herein in any orientation. Cooling circuits 86 may lead to a number of cooling holes 90 or other types of cooling pathways for film cooling about airfoil 60 or elsewhere. Other types of cooling methods may be used. Other components and or configurations also may be used herein.

Figure 3:
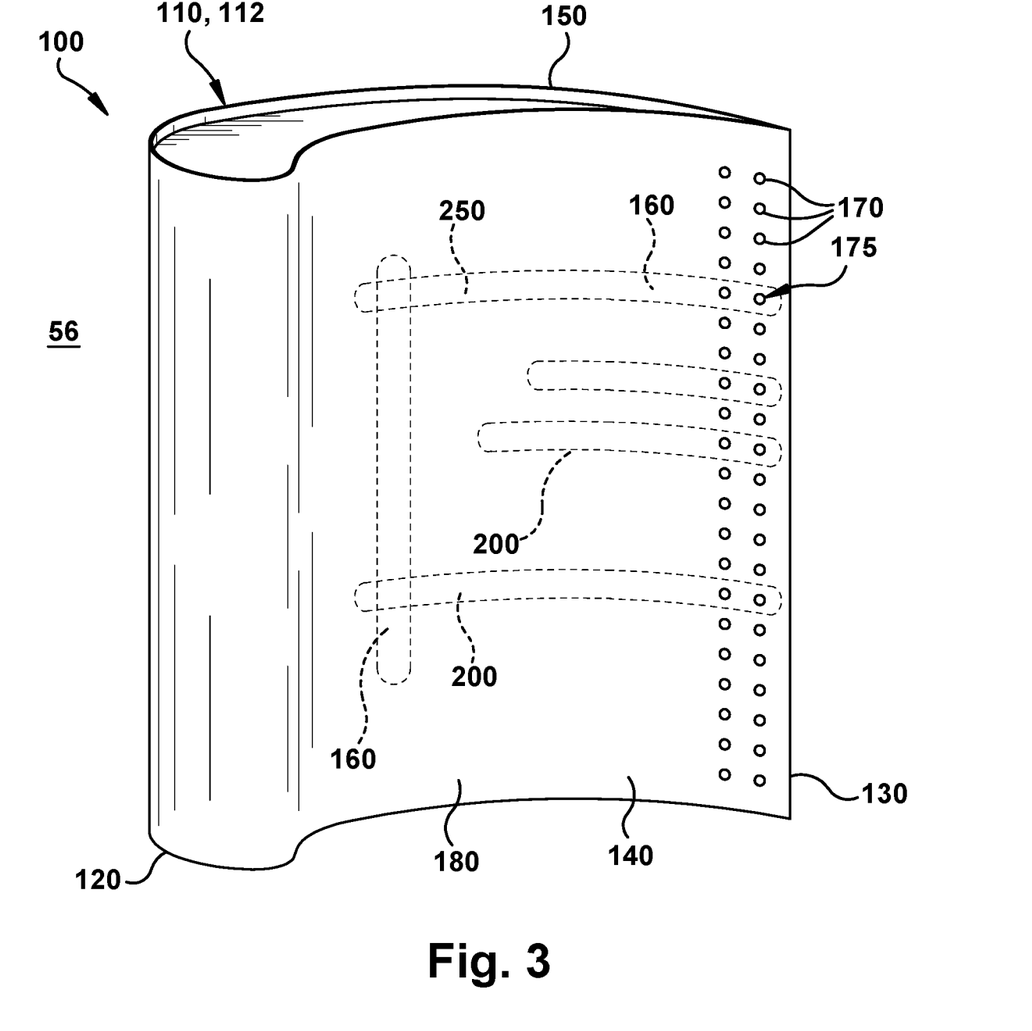
FIG. 3 is a perspective view of a portion of a hot gas path component according to embodiments of the disclosure without a thermal barrier coating (TBC) thereon.
Figure 4:
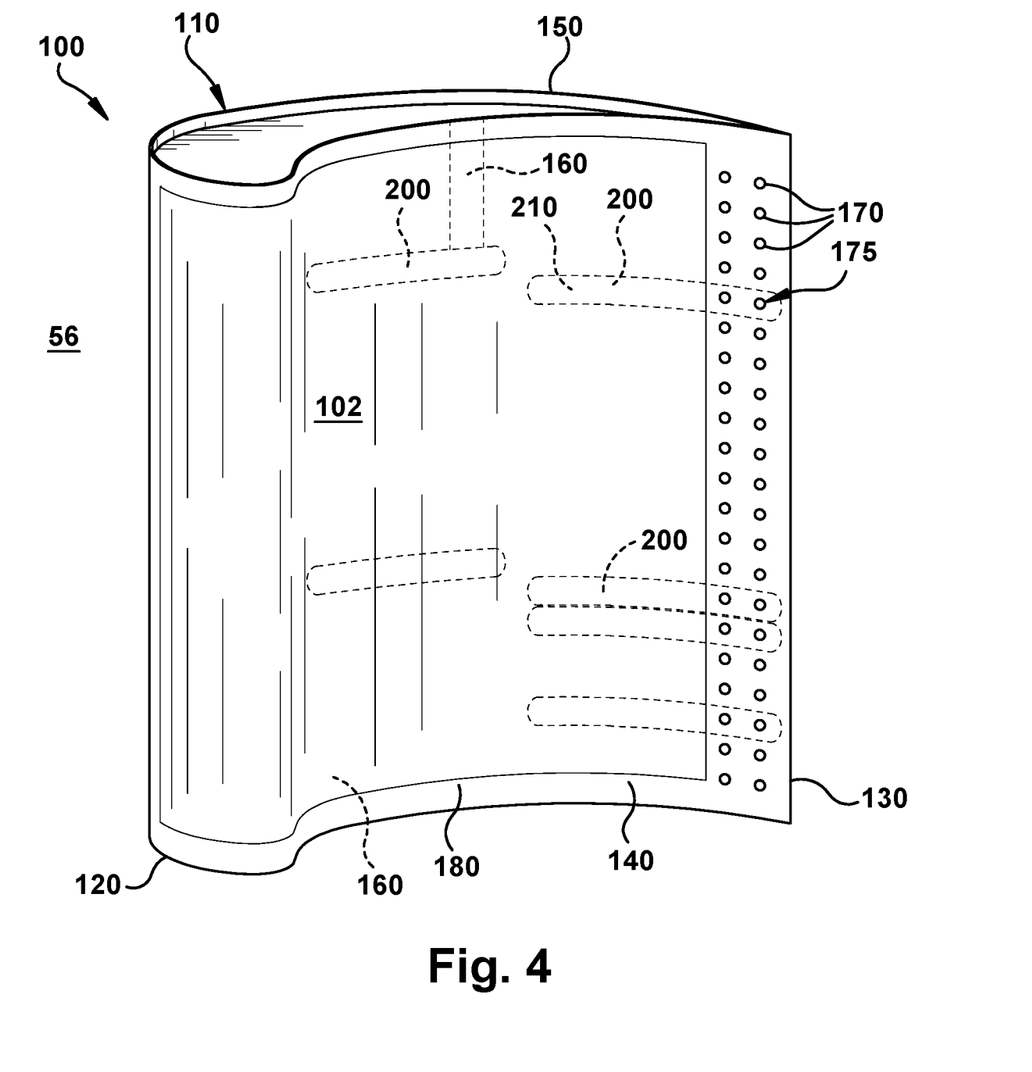
FIG. 4 is a perspective view of a portion of the HGP component of FIG. 3 including a thermal barrier coating according to embodiments of the disclosure.
Figure 5:
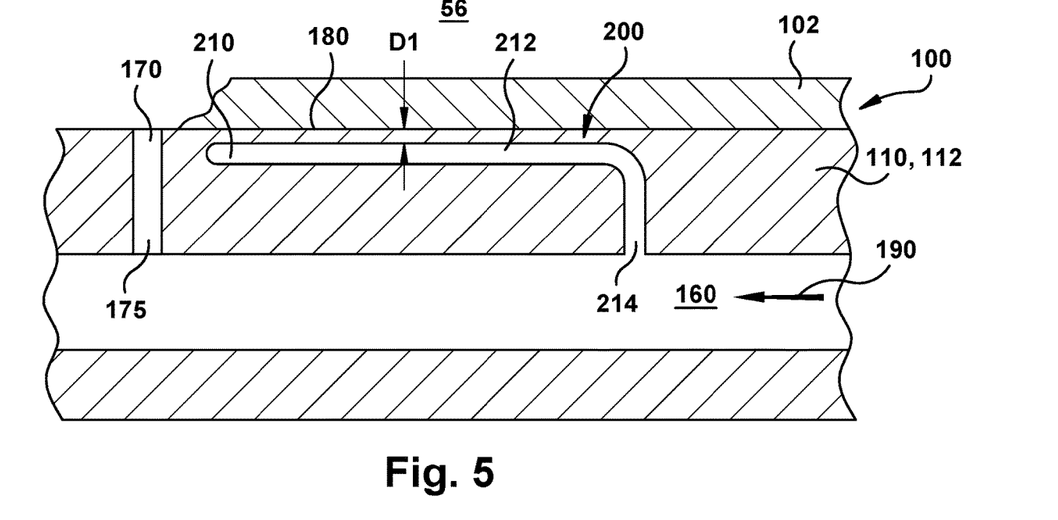
FIG. 5 is a cross-sectional view of a portion of the HGP component including a cooling pathway according to embodiments of the disclosure.

FIGS. 3-5 show an example of a portion of an HGP component 100 as may be described herein. FIG. 3 is a perspective view of HGP component 100 without a thermal barrier coating (TBC) 102 thereon, FIG. 4 is a perspective view of HGP component 100 with TBC 102 thereon, and FIG. 5 is a cross-sectional view of a portion of HGP component with TBC 102. In this example, HGP component 100 may be an airfoil 110 and more particularly a sidewall thereof. HGP component 100 may be a part of a blade or a vane and the like. HGP component 100 also may be any type of air-cooled component including a shank, a platform, or any type of hot gas path component. As noted, other types of HGP components and other configurations may be used herein. Similar to that described above, airfoil 110 may include a leading edge 120 and a trailing edge 130. Likewise, airfoil 110 may include a pressure side 140 and a suction side 150. Airfoil 110 also may include one or more internal cooling circuits 160 (FIGS. 3 and 5) therein. As shown in phantom in FIG. 3 and shown in cross-section in FIG. 5, internal cooling circuits 160 may lead to a number of cooling pathways 170 such as a number of cooling holes 175. A variety of internal cooling circuits 160 may be employed, not all of which are shown. Cooling circuits 160 may run radially and/or axially in airfoil 110. Cooling holes 175 may extend through an outer surface 180 of airfoil 110 or elsewhere. Outer surface 180 is exposed to a working fluid having a high temperature. As used herein, "high temperature" depends on the form of industrial machine, e.g., for gas turbine system 10, high temperature may be any temperature greater than 100° C. Internal cooling circuits 160 and cooling holes 175 serve to cool airfoil 110 and components thereof with a cooling medium 190 (FIG. 5) therein. Any type of cooling medium 190, such as air, steam, and the like, may be used herein from any source. Cooling holes 175 may have any size, shape, or configuration. Any number of cooling holes 175 may be used herein. Cooling holes 175 may extend to outer surface 180 in an orthogonal or non-orthogonal manner. Other types of cooling pathways 170 may be used herein. Other components and or configurations may be used herein.

As shown in FIG. 3-5, HGP component 100, e.g., airfoil 110, also may include a number of other adaptively opening, cooling pathways 200 (hereinafter "cooling pathway 200") according to embodiments of the disclosure. More particularly, HGP component 100 may include a body 112, e.g., sidewall of airfoil 110, including outer surface 180. Internal cooling circuit 160 may be in body 112 carrying cooling medium 190. Cooling pathways 200 may have any size, shape (e.g., circular, round, polygonal, etc.), or configuration. In one embodiment, cooling pathways 200 may have a dimension of approximately 0.25 millimeters (mm) to 2.5 mm, and nominally, approximately 0.76 mm to 1.27 mm. In one embodiment, cooling pathway 200 has a circular cross-section. Any number of cooling pathways 200 may be used herein, and they can extend in any direction and have any orientation within HGP component 100. As shown best in FIG. 5, cooling pathways 200 do not extend towards outer surface 180 in a manner similar to cooling holes 175, but are positioned at a first spacing D1 from outer surface 180. In one embodiment, first spacing D1 may be approximately 0.12 mm to 1.27 mm, and nominally, approximately 0.51 mm to 0.76 mm. More particularly, cooling pathway 200 may include a terminating end 210 in body 112 and a length 212 extending along and spaced internally from outer surface 180 by first spacing D1. An additional connecting cooling pathway 214 may also fluidly couple cooling pathway 200, i.e., length 212, to internal cooling circuit 160, but this may not be necessary depending on the location of internal cooling circuit 160 (see, e.g., FIG. 10). Cooling pathways 200 are not open through outer surface 180, when constructed. Thus, cooling pathways 200 are distinguishable from cooling pathways 170 and cooling holes 175 that are permanently open to outer surface 180. Length 212 can be any distance desired.

In one embodiment, first spacing D1 is substantially consistent along length 212 such that cooling pathway 200 extends parallel along and internally from outer surface 180. In other embodiments, some variation of first spacing D1 may be possible to accommodate structural variations such as but not limited to: a varied shape of outer surface 180, surface roughness of outer surface 180, variation of cooling pathway 200 as it progresses through body 112. First spacing D1 can thus vary so long as it is sufficiently thin to allow for opening of body 112 at a location 224 when a spall 222 occurs, as will be described herein.

Cooling pathways 200, as shown in FIGS. 4 and 5, may include a thermal barrier coating (TBC) 102 thereover. As shown in FIGS. 4 and 5, in contrast to cooling holes 175 (FIG. 3), TBC 102 is positioned over outer surface 180 in at least a portion of HGP component 100 to cover cooling pathways 200. TBC 102 extends over outer surface 180, and is exposed to HGP 56 including a working fluid having a high temperature, as previously noted. TBC 102 may include any now known or later developed layers of materials configured to protect outer surface 180 from thermal damage (e.g., creep, thermal fatigue cracking and/or oxidation) such as but not limited to: zirconia, yttria-stabilized zirconia, a noble metal-aluminide such as platinum aluminide, MCrAlY alloy in which M may be cobalt, nickel or cobalt-nickel alloy. TBC 102 may include multiple layers such as but not limited to a bond coat under a thermal barrier layer.

Figure 6:
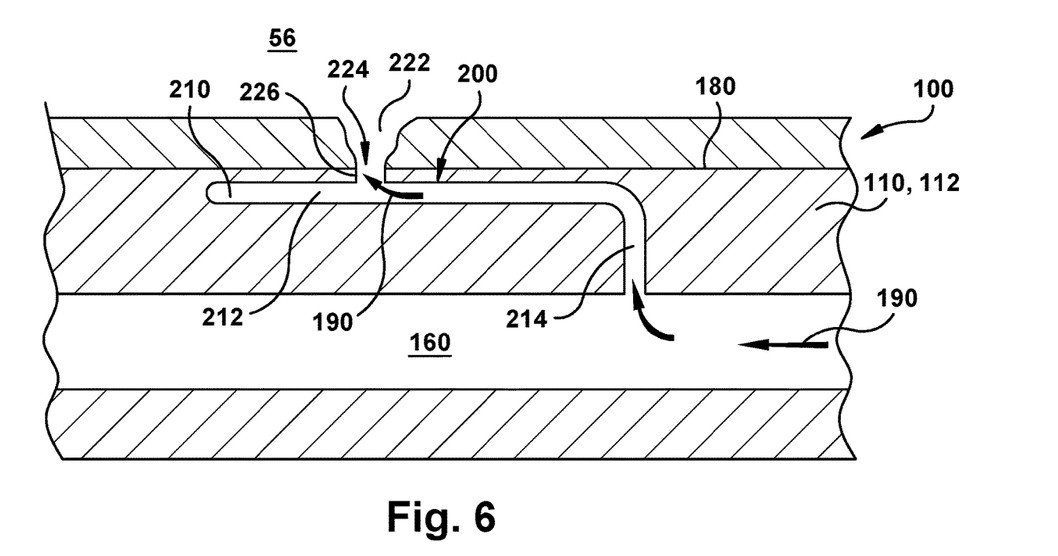
FIG. 6 is a cross-sectional view of a portion of the HGP component including a spall over the cooling pathway according to embodiments of the disclosure.

As shown in FIG. 6, in response to a spall 222 in TBC 102 occurring at a location 224 over cooling pathway 200 and the high temperature reaching or exceeding a predetermined temperature of body 112, cooling pathway 200 opens at location 224 through first spacing D1 to allow a flow of cooling medium 190 therethrough. Spall 222 may include any change in TBC 102 creating a thermal path to outer surface 180 from HGP 56 not previously present, e.g., a break or crack in, or displacement. While spall size may vary widely, in one example, spall 222 may have a dimension of approximately 2.54 mm to 25.4 mm, and nominally, approximately 0.64 mm. When spall 222 occurs, outer surface 180 would normally be exposed to the high temperatures and other extreme environments of HGP 56, where prior to spall 222 occurring outer surface 180 was protected by TBC 102. As used herein, the "predetermined temperature of body 112" is a temperature at which body 112 will change state in such a way as to allow its removal to create opening 226. In many cases, as shown in FIG. 6, exposure of body 112 having first spacing D1 (FIG. 5) to HGP 56 environment alone will provide the predetermined temperature sufficient for removal of body 112, e.g., through oxidation, sublimation, ashing or melting thereof. That is, the high temperature of HGP 56 causes a deterioration, or removal of first spacing D1 at location 224, creating an opening 226 to cooling pathway 200 at location 224. After spall 222 occurs, cooling medium 190 passes through opening 226 to outer surface 180. That is, because internal cooling circuits 160 are fluidly coupled to cooling pathways 200, cooling medium 190 passes through opening 226 and serves to cool airfoil 110 and body 112 and components thereof, despite spall 222. As noted, any type of cooling medium 190, such as air, steam, and the like, may be used herein from any source. Location 224 may be anywhere along length 212 of cooling pathway 200. In this fashion, even though the exact positioning of spall 222 cannot be accurately predicted, cooling pathway 200 can provide adequate cooling over length 212. In addition, an extent of spall 222 determines a size of opening 226 in cooling pathway 200, which automatically provides increased cooling for larger spalls 222 (larger opening) 226 and less cooling for smaller spalls 222 (smaller openings 226).

Figure 7:
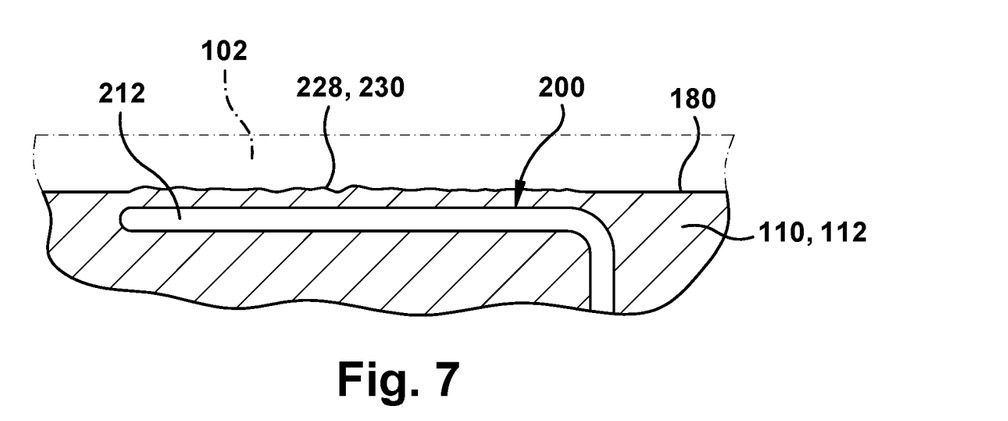
FIG. 7 is an enlarged cross-sectional view of a portion of the HGP component with a cooling pathway and an opening fostering surface according to embodiments of the disclosure.
Figure 8:
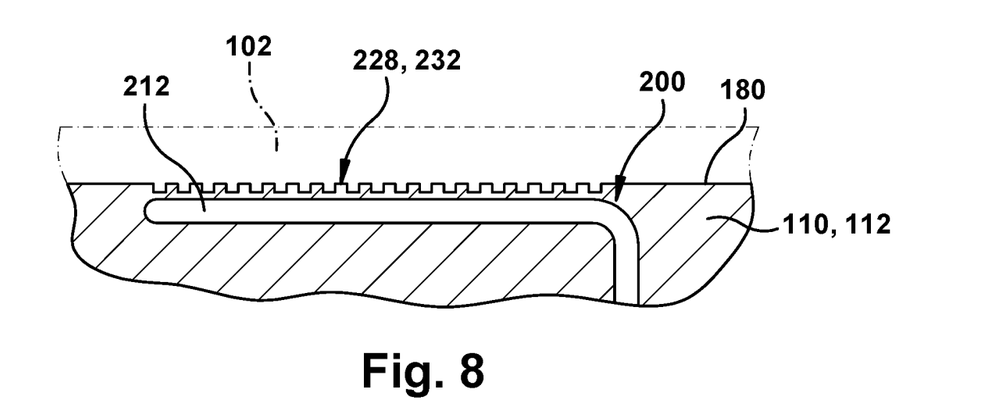
FIG. 8 is an enlarged cross-sectional view of a portion of the HGP component with a cooling pathway and an opening fostering surface according to another embodiment of the disclosure.

As shown in FIGS. 7-8, in some embodiments, an opening fostering surface 228 may be provided in outer surface 180 in a region over at least a portion of length 212 of cooling pathway 200. Opening fostering surface 228 may include any structure capable of increasing the likelihood or speed of creating opening 226. In one embodiment, shown in FIG. 7, opening fostering surface 228 may include a heat transfer enhancing surface 230. Heat transfer enhancing surface 230 is built into HGP component 100, i.e., it is original to HGP component 100 and does not come into existence through exposure by spall 222. Heat transfer enhancing surface 230 may take any form that increases heat transfer from HGP 56 to body 112 at location 224. For example, heat transfer enhancing surface 230 may include any surface that is less smooth than outer surface 180, i.e., with a higher surface roughness than outer surface 180. Surface 230 may be created in any fashion, e.g., during conventional manufacture or additive manufacture (e.g., in latter case by using build parameters that create a rougher surface than outer surface 180). In other embodiments, not shown, heat transfer enhancing surface 230 may include a bulged surface, a dimpled surface or a striped surface. Combinations of any of these embodiments may also be employed. Other heat transfer enhancing surfaces different than outer surface 180 may also be possible. In another embodiment, opening fostering surface 228 may include a material weakness 232 in body 112 such as but not limited to grooves, notches, porousness, etc. Although shown on outer surface 180, material weakness 234 may also be provided internally, i.e., on an inner surface of body 112 in cooling pathway 200.

Figure 9:
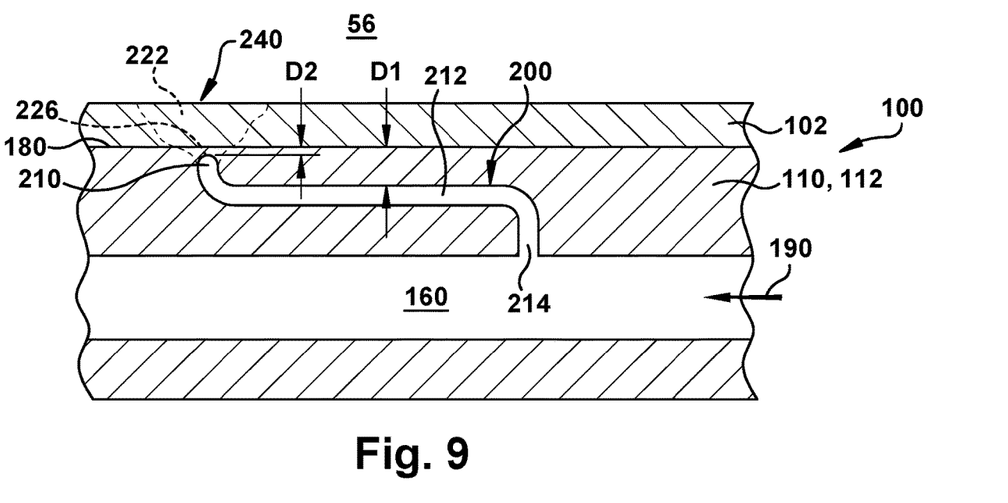
FIG. 9 is a cross-sectional view of a portion of the HGP component including a cooling pathway according to embodiments of the disclosure.

Referring to FIG. 9, in one embodiment, terminating end 210 may be spaced internally from outer surface 180 by a second spacing D2 that is less than first spacing D1 of the rest of cooling pathway 200. In one embodiment, second spacing D2 may be approximately 0.12 mm to 0.76 mm, and nominally, approximately 0.25 mm to 0.51 mm. In this case, terminating end 210 is closer to outer surface 180 than length 212 of cooling pathway 200. Here, in response to spall 222 (in phantom) in TBC 102 occurring at a location 240 over terminating end 210 and the high temperature reaching or exceeding a predetermined temperature of body 112, cooling pathway 200 opens at location 240 over terminating end 210 and through second spacing D2 to allow a flow of cooling medium 190 therethrough. In this fashion, where spall 222 over (directly over or near) terminating end 210, opening 226 (phantom) would open at terminating end 210, so cooling continues along length 212 as cooling medium 190 passes therealong prior to exiting opening 226. Any of the afore-described alternative embodiments may be employed with the FIG. 9 embodiment.

Figure 10:
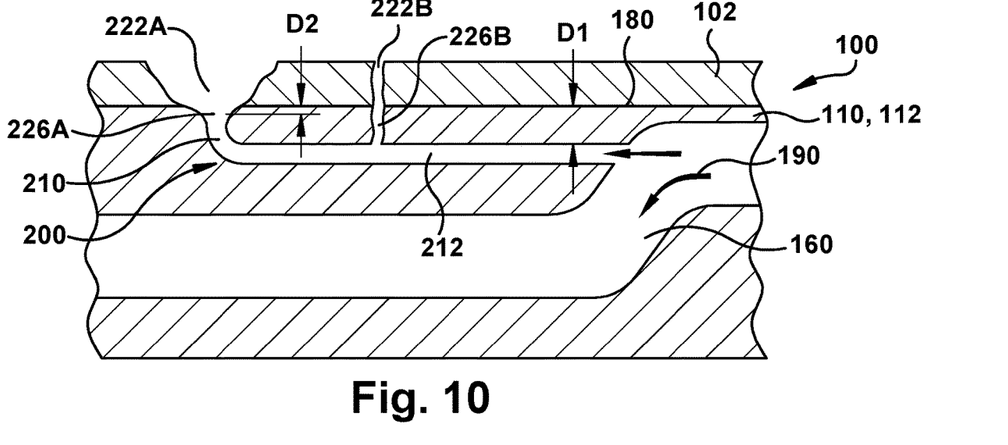
FIG. 10 is a cross-sectional view of a portion of the HGP component including a number of spalls over the cooling pathway of FIG. 9, according to embodiments of the disclosure.

FIG. 10 shows how a spall 222A may create an opening 226A at terminating end 210 through second spacing D2, and another spall 222B may create an opening 226B through first spacing D1. That is, more than one opening may be created by a number of spalls 222, creating numerous cooling options from cooling pathway 200.

FIGS. 11-15 show another embodiment of an adaptively opening cooling pathway 400 (hereinafter "cooling pathway 400") according to embodiments of the disclosure. In this embodiment, an HGP component 300, e.g., airfoil 110, also may include a number of cooling pathways 400 according to embodiments of the disclosure. More particularly, HGP component 300 may include body 112, e.g., sidewall of airfoil 110, including outer surface 180. Internal cooling circuit 160 may be in body 112 carrying cooling medium 190. Any number of cooling pathways 400 may be used herein, and they can be extend in any direction and have any orientation within HGP component 300. As shown best in FIG. 11, cooling pathways 400 do not extend towards outer surface 180 in a manner similar to cooling holes 175 (FIG. 3). More particularly, cooling pathway 400 may include a terminating end 410 in body 112 and a length 412. An additional connecting cooling pathway 414 may also fluidly couple cooling pathway 400, i.e., length 412, to internal cooling circuit 160, but this may not be necessary depending on the location of internal cooling circuit 160 (similar to FIG. 10).

Figure 11:
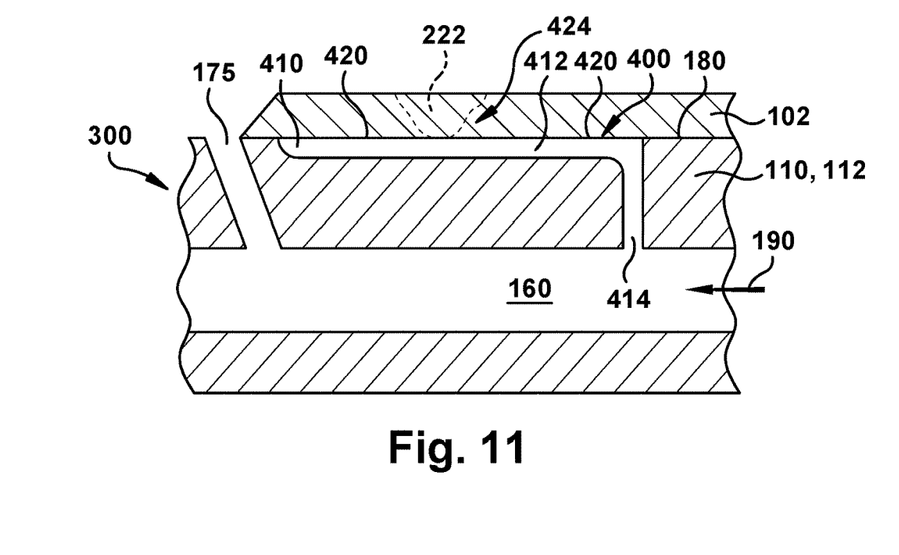
FIG. 11 is a longitudinal cross-sectional view of a portion of the HGP component including a cooling pathway according to other embodiments of the disclosure.
Figure 12:
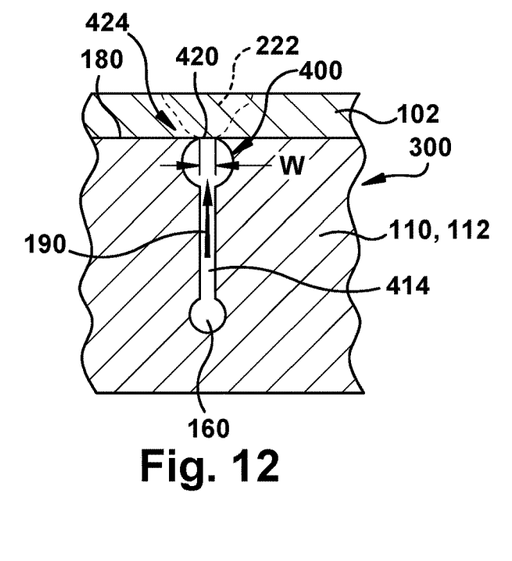
FIG. 12 is a lateral cross-sectional view of a portion of the HGP component of FIG. 11 including a spall over the cooling pathway according to embodiments of the disclosure.
Figure 13:
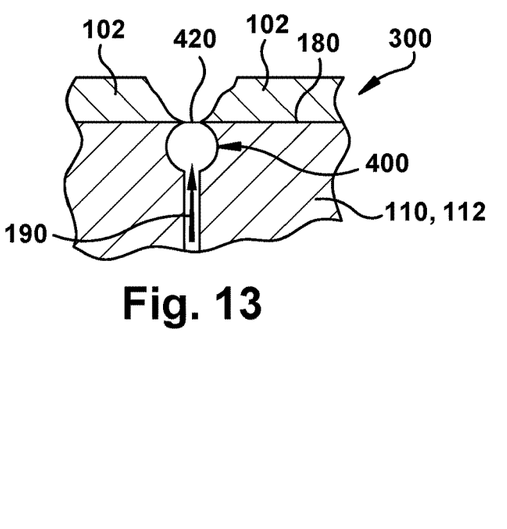
FIG. 13 is an enlarged cross-sectional view of a portion of the HGP component with an outer elongated opening according to an embodiment of the disclosure.
Figure 14:
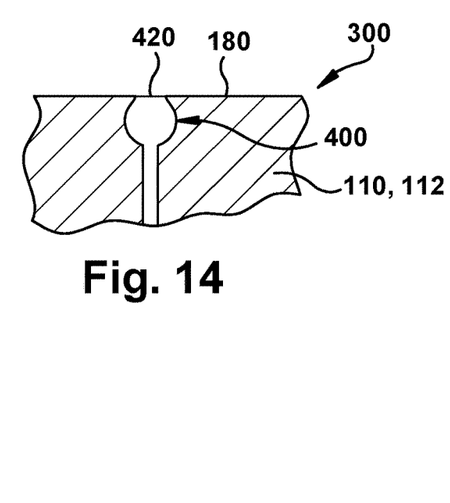
FIG. 14 is an enlarged cross-sectional view of a portion of the HGP component with an outer elongated opening according to another embodiment of the disclosure.
Figure 15:
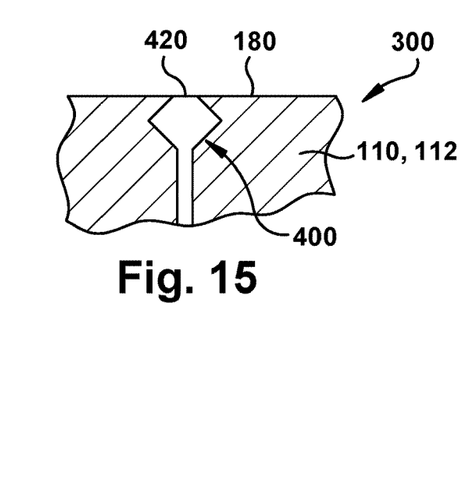
FIG. 15 is an enlarged cross-sectional view of a portion of the HGP component with an outer elongated opening according to yet another embodiment of the disclosure.

FIGS. 11-12 show cooling pathway 400 with TBC 102 thereover, and FIGS. 13-15 show various embodiments of an outer elongated opening 420 without TBC 102 thereover. FIG. 11 shows a longitudinal cross-sectional view, and FIGS. 12-15 shows lateral cross-sectional views. In contrast to cooling pathways 200 (FIGS. 5-10), and as shown best in FIGS. 12-15, cooling pathways 400 include an outer elongated opening 420. Outer elongated opening 420 has a width W (FIG. 12 only) configured to be open through outer surface 180 to allow cooling medium 190 therethrough, but is small enough to be closed or bridged by TBC 102. As shown best in FIGS. 11 and 12, TBC 102 extends over outer surface 180 and closes outer elongated opening 420 of cooling pathway 420. TBC 102 has a viscosity, when applied, that prevents TBC 102 entering length 412, or greatly inhibits the extent to which TBC 102 enters length 412. In one embodiment, width W is no greater than approximately 2.5 micrometers. However, width W may be configured based on the viscosity of TBC 102 when applied, and other dimensions may be possible.

TBC 102 is exposed to HGP 56, i.e., a working fluid, having a high temperature. Outer elongated opening 420 may extend the entirety of length 412 of cooling pathway 400, or cooling pathway 400 may recede within outer surface 180 after a certain length. Cooling pathways 400 are distinguishable from cooling pathways 170 and cooling holes 175 that are permanently open to outer surface 180 because TBC 102 closes cooling pathways 400. Length 412 can be any distance desired. Cooling pathways 400 may have any size, shape (e.g., circular, round, polygonal, etc.) providing elongated opening 420 can be created. In one embodiment, as shown in FIGS. 12 and 13, cooling pathway 400 has a circular cross-section. In this case, cooling pathways 400 may have a diameter, in one example, of approximately 0.51 mm to 1.27 mm, and nominally, approximately 0.76 mm to 1.02 mm. In other embodiments, cooling pathway 400 may have a tear-dropped cross-section (FIG. 14) or a polygonal cross-section (FIG. 15). Other shapes may also be possible.

Returning to FIGS. 11 and 12, in response to spall 222 occurring in TBC 102 at location 424 over outer elongated opening 420 of cooling pathway 420, outer elongated opening 420 of cooling pathway 400 allows a flow of the cooling medium 190 therethrough at the location. As noted, spall 222 may include any change in TBC 102 creating a thermal path to outer surface 180 from HGP 56 not previously present, e.g., a break or crack in, or displacement. In contrast to the embodiments of FIGS. 5-10, outer elongated opening 420 opens to allow flow of cooling medium 190 immediately upon occurrence of spall 222 because there is no time required to remove a part of body 112, e.g., first distance D1 (FIG. 10). After spall 222 occurs, cooling medium 190 passes through outer elongated opening 420 to outer surface 180. That is, because internal cooling circuits 160 are fluidly coupled to cooling pathways 400, cooling medium 190 passes through outer elongated opening 400 and serves to cool airfoil 110 and body 112 and components thereof. As noted, any type of cooling medium 190, such air, steam, and the like, may be used herein from any source. Location 424 may be anywhere along length 412 of cooling pathway 400. In this fashion, even though the exact positioning of spall 222 cannot be accurately predicted, cooling pathway 400 can provide adequate cooling over length 412. In addition, an extent of spall 222 determines a size of outer elongated opening 420 uncovered by TBC 102, which automatically provides increased cooling for larger spalls and less cooling for smaller spalls.

Figure 16:
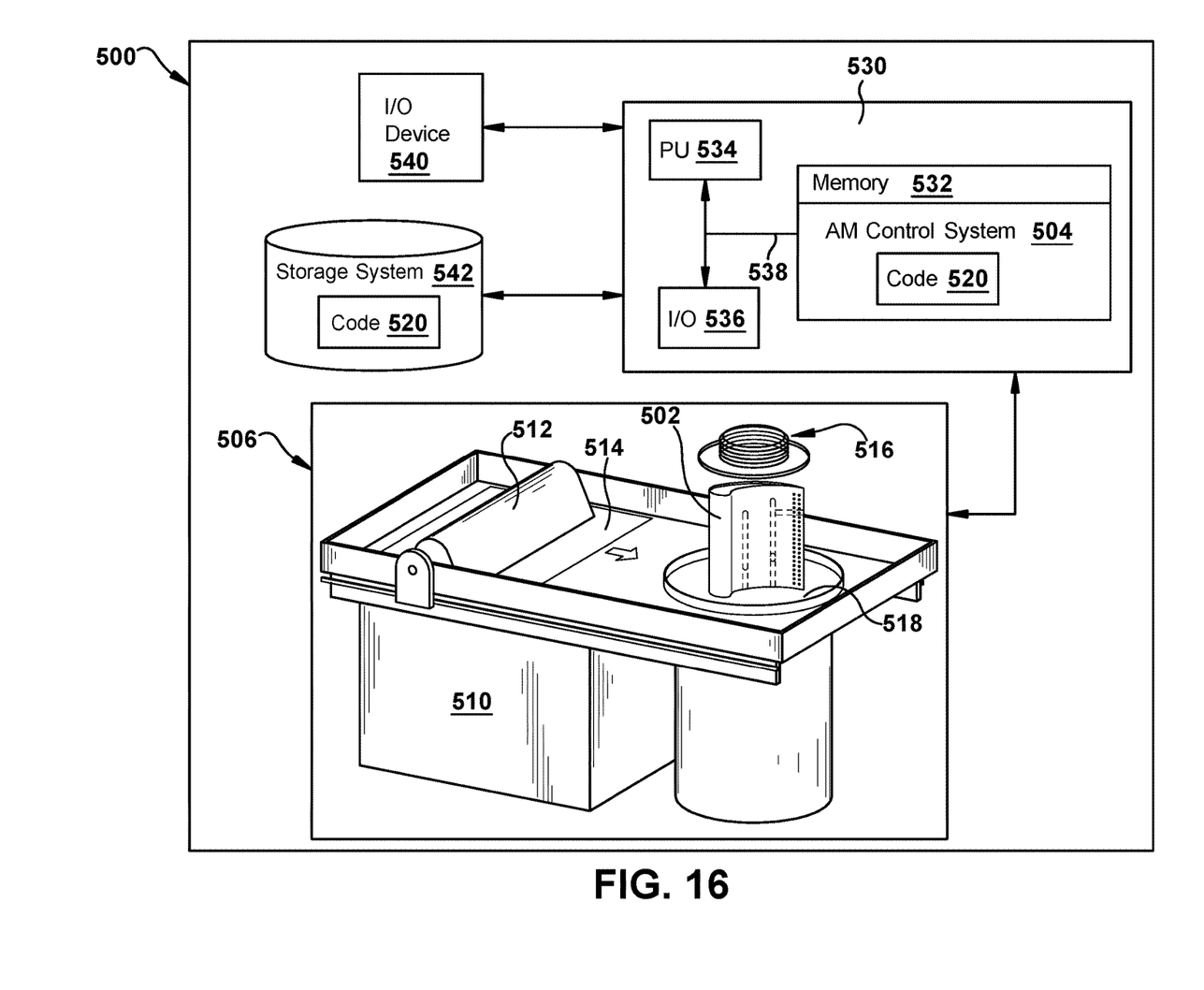
FIG. 16 is a block diagram of an additive manufacturing process including a non-transitory computer readable storage medium storing code representative of an HGP component according to embodiments of the disclosure.

HGP component 100, 300 and cooling pathway 200, 400 may be constructed entirely using conventional techniques, e.g., casting, machining, etc. Referring to FIG. 16, in accordance with embodiments of the disclosure, HGP component 100, 300 and cooling pathway 200, 400 may be additively manufactured. Additive manufacturing also allows for easy formation of much of the structure described herein, i.e., without very complex machining. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM).

To illustrate an example of an additive manufacturing process, FIG. 16 shows a schematic/block view of an illustrative computerized additive manufacturing system 500 for generating an object 502, i.e., HGP component 100, 300. In this example, system 500 is arranged for DMLM. It is understood that the general teachings of the disclosure are equally applicable to other forms of additive manufacturing. AM system 500 generally includes a computerized additive manufacturing (AM) control system 504 and an AM printer 506. AM system 500, as will be described, executes code 520 that includes a set of computer-executable instructions defining HGP component 100, 300 (FIGS. 5-15) and cooling pathways 200, 400, to physically generate the component using AM printer 506. Each AM process may use different raw materials in the form of, for example, fine-grain powder, liquid (e.g., polymers), sheet, etc., a stock of which may be held in a chamber 510 of AM printer 506. In the instant case, HGP component 100, 300 (FIGS. 5-15) may be made of metal powder or similar materials. As illustrated, an applicator 512 may create a thin layer of raw material 514 spread out as the blank canvas from which each successive slice of the final object will be created. In other cases, applicator 512 may directly apply or print the next layer onto a previous layer as defined by code 520, e.g., where the material is a polymer or where a metal binder jetting process is used. In the example shown, a laser or electron beam 516 fuses particles for each slice, as defined by code 520, but this may not be necessary where a quick setting liquid plastic/polymer is employed. Various parts of AM printer 506 may move to accommodate the addition of each new layer, e.g., a build platform 518 may lower and/or chamber 510 and/or applicator 512 may rise after each layer.

AM control system 504 is shown implemented on computer 530 as computer program code. To this extent, computer 530 is shown including a memory 532, a processor 534, an input/output (I/O) interface 536, and a bus 538. Further, computer 530 is shown in communication with an external I/O device/resource 540 and a storage system 542. In general, processor 534 executes computer program code, such as AM control system 504, that is stored in memory 532 and/or storage system 542 under instructions from code 520 representative of HGP component 100, 300 (FIGS. 5-15), described herein. While executing computer program code, processor 534 can read and/or write data to/from memory 532, storage system 542, I/O device 540 and/or AM printer 506. Bus 538 provides a communication link between each of the components in computer 530, and I/O device 540 can comprise any device that enables a user to interact with computer 540 (e.g., keyboard, pointing device, display, etc.). Computer 530 is only representative of various possible combinations of hardware and software. For example, processor 534 may comprise a single processing unit, or be distributed across one or more processing units in one or more locations, e.g., on a client and server. Similarly, memory 532 and/or storage system 542 may reside at one or more physical locations. Memory 532 and/or storage system 542 can comprise any combination of various types of non-transitory computer readable storage medium including magnetic media, optical media, random access memory (RAM), read only memory (ROM), etc. Computer 530 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 532, storage system 542, etc.) storing code 520 representative of HGP component 100, 300 (FIGS. 5-15). As noted, code 520 includes a set of computer-executable instructions defining object 502 that can be used to physically generate the object, upon execution of the code by system 500. For example, code 520 may include a precisely defined 3D model of HGP component 100, 300 (FIGS. 5-15) and can be generated from any of a large variety of well-known computer aided design (CAD) software systems such as Auto-CAD®, TurboCAD®, DesignCAD 3D Max, etc. In this regard, code 520 can take any now known or later developed file format. For example, code 520 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 520 may be translated between different formats, converted into a set of data signals and transmitted, received as a set of data signals and converted to code, stored, etc., as necessary. Code 520 may be an input to system 500 and may come from a part designer, an intellectual property (IP) provider, a design company, the operator or owner of system 500, or from other sources. In any event, AM control system 504 executes code 520, dividing HGP component 100, 300 (FIGS. 5-15) into a series of thin slices that it assembles using AM printer 506 in successive layers of liquid, powder, sheet or other material. In the DMLM example, each layer is melted to the exact geometry defined by code 520 and fused to the preceding layer.

Subsequent to additive manufacture, HGP component 100, 300 (FIGS. 5-15) may be exposed to any variety of finishing processes, e.g., minor machining, sealing, polishing, assembly to another part, etc.

In terms of the present disclosure, regardless of the manufacturing techniques used, TBC 102 may be applied to outer surface 180 of HGP component 100 and over cooling pathways 200, 400. TBC 102 may be applied using any now known or later developed coating techniques.

HGP component 100, 300 according to embodiments of the disclosure provides a cooling pathway 200, 400 that only opens in the area of spall 222 to cool that region and prevent damage to the underlying metal, which may significantly reduce nominal cooling flows. The size of spall 222 may dictate the size of the opening created, and hence the amount of cooling.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A component for use in a hot gas path of an industrial machine, the component comprising:
   a body including an outer surface;
   a thermal barrier coating over the outer surface, the thermal barrier coating exposed to a working fluid having a high temperature;
   an internal cooling circuit in the body carrying a cooling medium; and
   a cooling pathway in the body and in fluid communication with the internal cooling circuit, the cooling pathway including a terminating end in the body and a surface extending along and spaced internally from the outer surface by a first spacing,
   wherein in response to a spall in the thermal barrier coating occurring at a spall location over the cooling pathway and the high temperature reaching or exceeding a predetermined temperature of the body, a first portion of the surface of the cooling pathway other than the terminating end opens to establish a fluid communication at the spall location through the first spacing to allow a flow of the cooling medium therethrough, while a second portion of the surface of the cooling pathway remains intact.

2. The component of claim 1, wherein the first spacing is substantially consistent along a length of the cooling pathway such that the cooling pathway extends parallel along and internally from the outer surface.

3. The component of claim 1, wherein the cooling pathway has a circular cross-section.

4. The component of claim 1, wherein an extent of the spall determines a size of the first portion in the cooling pathway.

5. The component of claim 1, wherein the terminating end is spaced internally from the outer surface by a second spacing that is less than the first spacing,
wherein in response to the spall in the thermal barrier coating occurring at a location over the terminating end and the high temperature reaching or exceeding a predetermined temperature of the body, the cooling pathway opens at the location over the terminating end and through the second spacing to allow a flow of the cooling medium therethrough.

6. A component for use in a hot gas path of an industrial machine, the component comprising:
a body including an outer surface;
a thermal barrier coating over the outer surface, the thermal barrier coating exposed to a working fluid having a high temperature;
an internal cooling circuit in the body carrying a cooling medium; and
a cooling pathway in the body and in fluid communication with the internal cooling circuit, the cooling pathway including a terminating end in the body and a length extending along and spaced internally from the outer surface by a first spacing, wherein the terminating end is spaced internally from the outer surface by a second spacing that is less than the first spacing,
wherein in response to a spall in the thermal barrier coating occurring at a location over the terminating end and the high temperature reaching or exceeding a predetermined temperature of the body, the cooling pathway opens at the location over the terminating end and through the second spacing to allow a flow of the cooling medium therethrough.

7. The component of claim 6, wherein the first spacing is substantially consistent along the length such that the cooling pathway extends parallel along and internally from the outer surface.

8. The component of claim 6, further comprising an opening fostering surface in the outer surface in a region over the terminating end of the cooling pathway.

9. The component of claim 8, wherein the opening fostering surface includes a heat transfer enhancing surface.

10. The component of claim 8, wherein the opening fostering surface includes a material weakness in the body.

11. The component of claim 6, wherein the cooling pathway has a circular cross-section.

12. The component of claim 8, wherein in response to the spall in the thermal barrier coating occurring at a location over the cooling pathway and the high temperature reaching or exceeding a predetermined temperature of the body, the cooling pathway opens at the location through the first spacing to allow a flow of the cooling medium therethrough.

13. The component of claim 11, wherein the cooling pathway has a tear-dropped cross-section.

14. The component of claim 11, wherein an extent of the spall determines a size of an opening at the location.

15. A component for use in a hot gas path of an industrial machine, the component comprising:
a body including an outer surface;
a thermal barrier coating over the outer surface, the thermal barrier coating exposed to a working fluid having a high temperature;
an internal cooling circuit in the body carrying a cooling medium; and
a cooling pathway in the body and in fluid communication with the internal cooling circuit, the cooling pathway including a terminating end in the body and a surface extending along and spaced internally from the outer surface by a first spacing,
wherein in response to a spall in the thermal barrier coating occurring at a location over the cooling pathway and the high temperature reaching or exceeding a predetermined temperature of the body, a portion of the cooling pathway other than the terminating end opens through the first spacing to allow a flow of the cooling medium therethrough, and
the component further comprises an opening fostering surface positioned between the thermal barrier coating and the cooling pathway.

16. The component of claim 15, wherein the opening fostering surface includes a heat transfer enhancing surface.

17. The component of claim 15, wherein the opening fostering surface includes a material weakness in the body.

* * * * *